(12) United States Patent
Mosebach (10) Patent No.: US 12,077,052 B2
(45) Date of Patent: Sep. 3, 2024

(54) POWER MANAGEMENT AND DISTRIBUTION DEVICE

(71) Applicant: TQ-Systems GmbH, Seefeld (DE)

(72) Inventor: Dieter Mosebach, Mittelnkirchen (DE)

(73) Assignee: TQ-Systems GmbH (DE)

( * ) Notice: Subject to any disclaimer, the term of this patent is extended or adjusted under 35 U.S.C. 154(b) by 510 days.

(21) Appl. No.: 17/328,175

(22) Filed: May 24, 2021

(65) Prior Publication Data

US 2021/0379996 A1    Dec. 9, 2021

(30) Foreign Application Priority Data

Jun. 9, 2020 (EP) ..................................... 20179101

(51) Int. Cl.
*B60L 1/00* (2006.01)
*B64D 11/00* (2006.01)

(52) U.S. Cl.
CPC .............. *B60L 1/006* (2013.01); *B64D 11/00* (2013.01); *B60L 2200/10* (2013.01)

(58) Field of Classification Search
CPC ... G05F 1/10; G05F 1/46; G05F 1/462; G05F 1/66; G05F 1/70; B60L 1/006; B60L 2200/10; B64D 2221/00; B64D 11/00; B64D 11/0015; G06F 1/3215; G06F 1/266; H02J 2310/44
See application file for complete search history.

(56) References Cited

U.S. PATENT DOCUMENTS

| | | | | |
|---|---|---|---|---|
| 9,715,271 B2* | 7/2017 | Kaestner | .................... | G06F 1/28 |
| 9,914,548 B1* | 3/2018 | Vadillo | ..................... | H02J 7/00 |
| 2014/0325245 A1* | 10/2014 | Santini | ..................... | G06F 1/266 |
| | | | | 713/300 |
| 2016/0329724 A1* | 11/2016 | Ibrahim | ................ | H02J 7/0013 |
| 2018/0323626 A1* | 11/2018 | Suen | ....................... | B60L 1/006 |

* cited by examiner

*Primary Examiner* — Mong-Shune Chung
(74) *Attorney, Agent, or Firm* — Greenberg Traurig, LLP (57) ABSTRACT

The present invention relates to a power management and distribution device (4) for powering personal electronic devices via outlet units (6a, 6b) at passenger seats in an airplane cabin, wherein the power management and distribution device (4) comprises a first interface (12) for receiving electrical supply power (10) from a master control unit (2) connected to a primary power source (3), a second interface (14) for supplying electrical supply power (10) received at said first interface (12) to another power management and distribution device (4i), a third interface (16) for supplying electrical supply power (10) received at said first interface (12) to the personal electronic devices via the outlet units (6a, 6b), and a control unit (18) configured to control the electrical outlet power (20) drawn by the personal electronic devices via the outlet units (6a, 6b). Further, the present invention relates to a power management and distribution system (1) comprising such a device, and to a method for managing and distributing power in an airplane cabin.

14 Claims, 5 Drawing Sheets

POWER MANAGEMENT AND DISTRIBUTION DEVICE

CROSS REFERENCE TO RELATED APPLICATIONS

This application claims the benefit of and priority to European Patent Application No. 20179101.9, filed Jun. 9, 2020, the entire contents of which are incorporated by reference herein.

TECHNICAL FIELD

The present invention relates to a power management and distribution device for powering personal electronic devices in an airplane cabin. Furthermore, the present invention relates to a power management and distribution system, and to a method for powering personal electric devices in an airplane cabin.

STATE OF THE ART

Electrical power for powering personal electronic devices (PEDs) onboard an airplane is often limited. To distribute the available power between a plurality of personal electronic devices, U.S. Pat. No. 9,914,548 B1 relates to a power management and load distribution circuit with a centralized control and distribution of electrical power for all PEDs.

SUMMARY OF THE INVENTION

Within this disclosure, electrical power may be transmitted between two entities, e.g. units or devices, which are directly or indirectly electrically connected. A direct electrical connection between two entities is provided by only a power connection, e.g. a single cable or multiple connected cables (having one or multiple litz wires). In contrast, an indirect electrical connection between two entities is provided via at least one further entity, e.g. a third unit or device. Likewise, information or data may be transmitted between two entities, e.g. two units or devices, which are directly or indirectly electronically connected. A direct electronical connection between two entities is provided by only a data connection, e.g. a single data cable or multiple connected data cables (having one or multiple litz wires). In contrast, an indirect electronical connection between two entities is provided via at least one further entity, e.g. a third unit or device. In an indirect electronical connection between two entities, data processing in between said two entities may occur.

The present invention relates to a power management and distribution device (PMDD) for powering personal electronic devices (PEDs) via outlet units. Each outlet unit may be configured to power a single or multiple PEDs. Some or all of the outlet units may comprise a plug for powering one or multiple PEDs via a cable. Additionally or alternatively, some or all of the outlet units may be configured to power one or multiple PEDs wirelessly. Each of the outlet units may be provided at a passenger seat in the cabin of an airplane. Each seat group in the cabin may be assigned to one PMDD for powering PEDs via outlet units at the seat group's seats. A seat group consisting of three seats may therefore comprise a single PMDD assigned to said group as well as a single outlet unit for each seat (three outlet units in total) powered by the single PMDD, for example. The PMDD may comprise a single housing, preferably an aluminum housing, in which all of its components may be accommodated. The PMDD may be retrofittable into existing airplanes. PEDs may include smartphones, tablets, laptops, and further personal electronic devices.

The PMDD of the present invention comprises a first interface for receiving electrical supply power from a master control unit (MCU) connected to a primary power source. The primary power source may be an alternating current (AC) power source and may provide primary electrical power to the MCU. The primary power source may be an aircraft engine, which may comprise a turbine driving a generator. The MCU may convert the primary electrical power received from said power source to electrical supply power for one or multiple PMDDs. Furthermore, the PMDD comprises a second interface for supplying at least a portion of the electrical supply power received at said first interface to another PMDD. The first and second interfaces may be directly electrically and/or electronically connected inside the PMDD, e.g. inside the PMDD housing. Alternatively, said connection may be active and/or indirect, e.g. a control unit, such as a microcontroller, may receive power and/or data via the first interface from the MCU, may optionally process the data and/or convert the power and may supply said power and/or data via the second interface to another PMDD. The first and second interfaces may each be configured as a plug, e.g. comprising an EN4165 outlet, and/or may each provide a single or multiple power lines, e.g. for providing three phases of power.

The PMDD comprises a third interface for supplying at least a portion of the electrical supply power received at said first interface to the PEDs via the outlet units. The third interface may be configured as a plug, e.g. comprising a SUB-D outlet. The third interface may comprise one outlet for a plurality and/or all of the outlet units supplied by the PMDD with power. The third interface may comprise one outlet for each outlet unit supplied by the PMDD with power. The first and third interfaces may be indirectly connected electrically and/or electronically inside the PMDD, e.g. inside the housing of the PMDD. The indirect electronical connection may be via a control unit.

In addition, the PMDD comprises a control unit, which may be a microcontroller, configured, i.e. specifically adapted, e.g. programmed, to control the electrical outlet power drawn by the PEDs via the outlet units. The control unit may be powered by a fractional part of electrical supply power received at the first interface. The control unit may limit the electrical outlet power drawn by all of the PEDs connected to said PMDD to ensure that all of said PEDs do not draw more power from the PMDD than a predefined limit. The PMDD may disable some or all of the outlet units and/or assign a power limit value to some or all of the outlet units. Each of the outlet units may be assigned the same power limit value by the control unit. Alternatively, the control unit may assign an individual power limit to each of the outlet units, wherein said individual power limits may be different from each other. When assigning power limit values to the outlet units, the control unit may take the power needed for powering the outlet units themselves into account.

Advantageously, by controlling the electrical outlet power for powering the PEDs decentralized for each seat group via the PMDD of the present invention, a more versatile power distribution is made possible. Specifically, the available power for powering PEDs may be distributed more intelligently, ensuring an improved user experience. In particular, in the present invention, the power limits for the PEDs may be controlled decentralized in the PMDDs, especially with relatively small PMDDs regarding the power they can supply, instead of centralized in the MCU. The present invention thus allows for the usage of relatively small PMDDs, which can be easily integrated in seat groups/the cabin, at the same time providing satisfactory power to a plurality of PEDs/users. With the PMDD of the present invention it is thus made possible that PEDs of different PMDDs, e.g. different seat groups, do not influence each other by using small-clustered PMDDs.

According to an embodiment of the present invention, the control unit is configured to determine a power control signal for controlling the electrical outlet power drawn by at least one of the PEDs via at least one of the outlet units. In an embodiment, the control unit is configured to determine such a power control signal for each of the PEDs connected to the PMDD. In addition, the PMDD is configured to send the power control signal to the at least one outlet unit via the third interface. The power control signal may be sent periodically by the PMDD. The outlet unit connected to the third interface of the PMDD may receive the power control signal and may implement the power control for the PED coupled to said outlet unit on its own. For example, if the control unit of the PMDD determines that the power of said outlet unit should be limited to a certain value, the power control signal may transport said information to the outlet unit, which may implement said power limitation. This embodiment provides the advantage that the power limitation is implemented directly at the outlet unit, thereby simplifying the configuration of the PMDD.

The control unit of the PMDD may determine the power control signal for controlling the electrical outlet power drawn by the PEDs via the outlet units based on a tri-state signal received from the MCU via the first interface. Said tri-state signal may indicate either switching-off unused outlet units, switching-off all outlet units, or using all outlet units. The tri-state signal may be supplied to another PMDD via the second interface.

According to an embodiment of the present invention, the PMDD further comprises a power measurement unit configured to measure the electrical outlet power drawn by the PEDs via the outlet units. The power measurement unit may comprise a voltmeter and/or an amperemeter. The PMDD may comprise a power measurement unit configured to measure electrical outlet power drawn by each of the PEDs at each of the outlet units individually and/or may be configured to determine a total electrical outlet power drawn by all outlet units and/or all PEDs comprehensively. The control unit may be configured to the limit electrical outlet power drawn by the PEDs via the outlet units based on the measured electrical outlet power. This allows for an optimal exploitation of the available power, therefore maximizing user experience.

According to an embodiment of the present invention, the PMDD further comprises a non-volatile memory connected to the control unit, wherein said non-volatile memory comprises a power limit of the PMDD. The non-volatile memory may be at least readably accessible. The non-volatile memory may be one of an EPROM and/or an EEPROM. The non-volatile memory may comprise more than one power limit. The power limit may be changed via one of said first, second or third interfaces. The power limit may be a PMDD specific value and/or a value which is determined based on the cabin layout. The power limit may be a static value which is not changed during normal and intended operation of the PMDD. The control unit may be configured to limit the electrical outlet power drawn by the PEDs via the outlet units based on a comparison of the measured electrical outlet power and said power limit. If the measured electrical outlet power is larger than the power limit value, the control unit may decrease the power limit for all or some of the PEDs to ensure that the PMDD operates within its power limit, for example. Advantageously, by providing each PMDD with its own power limit, differently equipped PMDDs with different power limits may be used in combination. For instance, a PMDD with a relatively high power limit may be used for a seat group in the business class for supplying a first number of seats with power. Another PMDD with a lower power limit may be used for a seat group in the economy class for supplying a second number of seats with power, wherein the first number of seats may be equal or even smaller than the second number of seats. Furthermore, this embodiment ensures that each of the PMDDs operates within its power limit value in an easy and reliable way.

According to an embodiment of the present invention, the control unit is configured to limit the electrical outlet power drawn by the PEDs via the outlet units to a finite number of discrete power levels. Said discrete power levels may be predetermined and stored on the non-volatile memory of the PMDD. Said discrete levels may be 0 W, 15/10 W, 27 W, 45 W, and 60 W, for example. Said discrete power levels may form a 5-state signal. The control unit may be configured to limit the electrical outlet power drawn by the PEDs via the outlet units to one of said discrete power values. In other words, the control unit may assign one of said five discrete values to each of its PEDs and/or outlet units, respectively. Advantageously, the discrete levels of electrical outlet power supplied to the PEDs may be set according to charging standards of said PEDs. Furthermore, using five discrete values of power limits provides an adaptive and at the same time simple PMDD device.

According to an embodiment of the present invention, the control unit is configured to limit the electrical outlet power drawn by the PEDs via the outlet units to the same power level for all outlet units of the PMDD. This simplifies control while at the same time ensuring an effective distribution of available power within the seat group. Specifically, only for the PEDs connected to the same PMDD the power limits are set to the same power limit value within this embodiment but not for all PEDs within the entire cabin. PEDs of a different PMDD may exhibit a different power limit value.

According to an embodiment of the invention, the PMDD comprises an AC/DC conversion device configured to convert AC electrical supply power supplied by the MCU via the first interface to DC electrical outlet power supplied to the PEDs via the third interface and the outlet units. The AC electrical supply power may in between 26-300 VAC, preferably between 100-130 VAC, more preferably around 115 VAC. Preferably, the DC electrical outlet power provided by the PMDD is between 5-100 VDC, more preferably around 10-50 VDC, more preferably around 28 VDC. The AC/DC conversion device may comprise an AC/DC convertor and a separate DC/DC convertor. The AC/DC converter may comprise an active-rectifier. The DC/DC converter may comprise an LLC half-bridge or full bridge, an LLC transformer and/or a synchronous rectifier. The AC/DC converter and/or the DC/DC converter may be controllable, preferably by the control unit of the PMDD. This embodiment provides the advantage that the device comprising the AC/DC conversion device is also configured to limit the power drawn by the PEDs via the outlet units of the PMDD.

According to an embodiment of the invention, the PMDD further comprises a fourth interface. The fourth interface may be configured to supply in-flight entertainment (IFE) screens with electrical outlet power, which may be a portion of the supply power received via the first interface. Preferably, the control unit is configured to supply the IFE screens with electrical outlet power. In an embodiment, the IFE screens may be supplied with electrical outlet power from the PMDD even if the power limit of the PMDD is reached and the control unit limits the electrical outlet power drawn by the PEDs via the outlet units.

Furthermore, the present invention relates to a power management and distribution system (PMDS) comprising at least one PMDD according to any one of the above described embodiments and at least two outlet units connected to the third interface of the PMDD. Each outlet unit may comprise at least one USB outlet and may be configured to supply electrical outlet power to a PED connected to said USB outlet. Each outlet unit may comprise a separate housing, e.g. a plastic housing, in which all of its components may be accommodated, wherein each of said housings may be separate from a housing of the PMDD. Preferably, the PMDS may comprise up to eight outlet units and therefore up to eight USB outlets configured to supply electrical outlet power to up to eight PEDs simultaneously.

According to an embodiment of the invention, the outlet units are each configured to receive the power control signal from the PMDD and are each configured to limit the drawn electrical outlet power by the PEDs according to the power control signal. Each outlet unit may be unidirectionally electronically connected to the PMDD, preferably via the third interface of the PMDD. Said connection may be a direct electronical connection between the PMDD and the outlet unit. Each outlet unit may implement the received power control signal, e.g. by using a converter and/or a transistor, to limit the power drawn by the PED connected to said outlet unit according to the power control signal.

According to an embodiment of the present invention, each of the outlet units comprises a power delivery unit (PDU) configured to negotiate a power contract with a coupled PED based on the power control signal received from the PMDD via the third interface. The negotiation may be done via a handshake function between the outlet unit and the PED. The PDU may be a power delivery controller. Preferably, the negotiation may include the limitation indicated by the power control signal from the PMDD. The PDU may control said converter and said transistor to provide electrical outlet power to the PED according to the negotiation and the power control signal. Advantageously, by combining the negotiation and power limitation, one functionality of the outlet unit may be used to achieve two purposes. This results in a PMDD with simplified configuration and reconfiguration.

According to another embodiment of the present invention, at least one of said outlet units comprises an outlet plug for USB-C and a further different outlet plug for USB-A. This allows for connection and/or charging of a variety of different PEDs over a single outlet unit.

According to an embodiment of the present invention, the PMDS further comprises an MCU configured to receive primary electrical power from a primary power source. Further, the PMDS comprises a plurality of PMDDs according to any of the above described embodiments, each configured to receive electrical supply power from the MCU via its first interface. The PMDS may comprise the primary power source. The MCU may be configured to measure electrical supply power supplied to the PMDDs and may be configured to compare this with a predefined value, which may be stored on a non-volatile storage of the MCU. The MCU may determine a tri-state signal, preferably based on said comparison. The MCU may indicate via the tri-state signal either a switching-off of all unused outlet units in case of higher electrical supply power drawn by the PMDDs compared to the predefined value of the MCU. The MCU may indicate via the tri-state signal a switching-off of all outlet units in case of take-off or landing. The MCU may indicate via the tri-state signal to use all outlet units in case of lower electrical supply power drawn by the PMDDs compared to the predefined value of the MCU. Each of the PMDDs may be configured to receive said tri-state signal, either via a direct electronical connection to the MCU or via an indirect electronical connection to the MCU. Each PMDD's control unit may be configured to determine the power control signal based on the tri-state signal received from the MCU via the first interface.

According to an embodiment of the present invention, a first PMDD is connected to the MCU via its first interface directly electrically and electronically, and a second PMDD is connected to the MCU via its first interface indirectly electrically and electronically. Specifically, the second PMDD is connected via its first interface electrically and electronically directly to the second interface of the first PMDD in a daisy chain fashion.

The present invention further relates to a method for managing and distributing power in an airplane cabin with a PMDD. Preferably, the method is executed by a PMDD according to one of the above described embodiments. The method comprises a step of measuring the electrical outlet power drawn by the PEDs via outlet units. The method comprises a step of determining a power control signal based on a comparison of the measured electrical outlet power with a power limit of the PMDD. The method comprises a step of sending the power control signal to the outlet units for limiting the electrical outlet power drawn by the PEDs via the outlet units. Preferably, the steps are executed in said order. The method may further comprise the step of receiving the tri-state signal from the MCU. The method may further comprise the step of determining the power control signal based on said tri-state signal and/or the measured electrical outlet power.

DETAILED DESCRIPTION OF EMBODIMENTS

Figure 1:
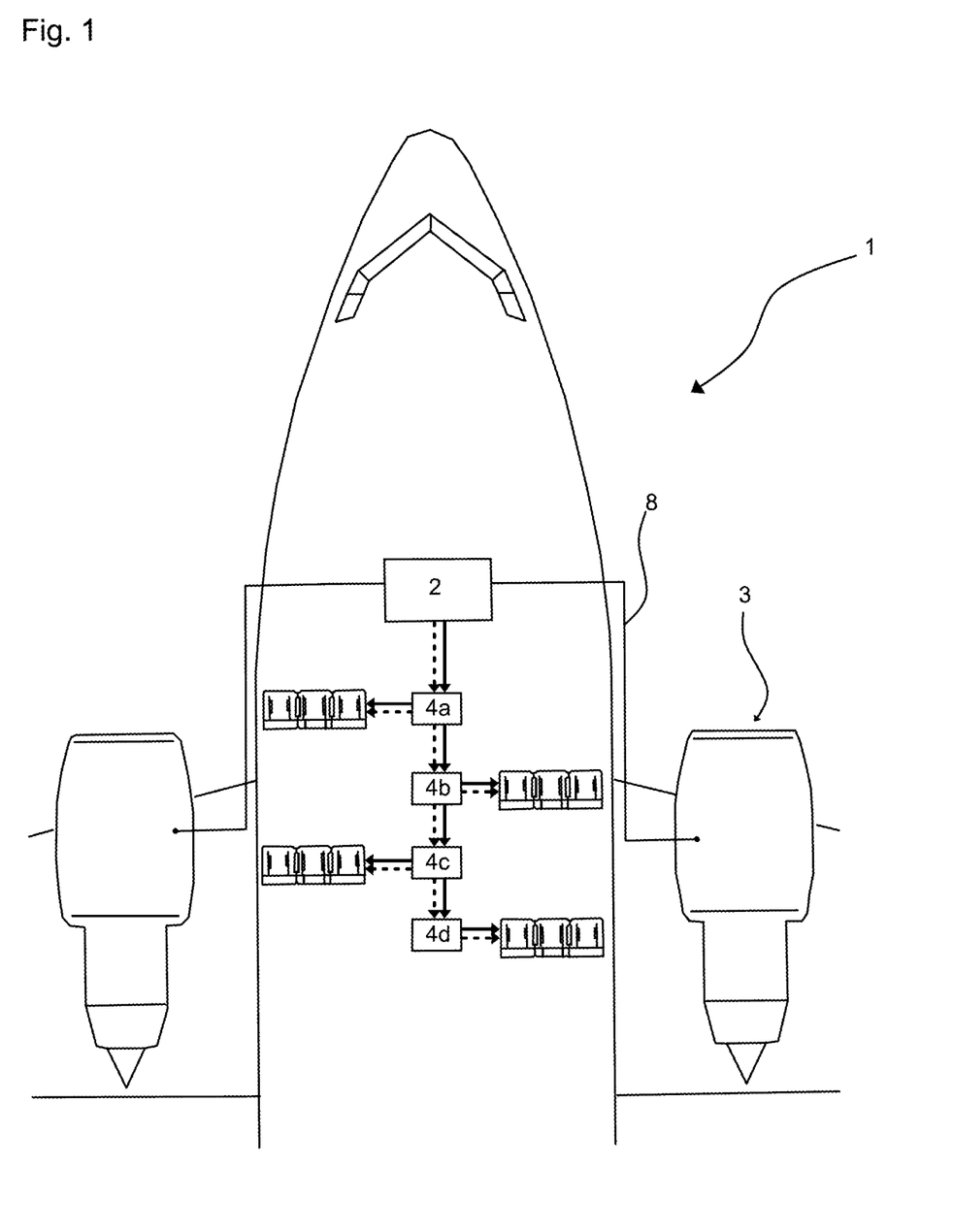
FIG. 1 schematically shows an airplane cabin with a power management and distribution system according to an embodiment of the present invention.

FIG. 1 shows a power management and distribution system (PMDS) 1 in an airplane cabin according to an embodiment of the present invention. The power management and distribution system 1 is configured to power personal electronic devices at a plurality of seats in said airplane cabin. The PMDS comprises a master control unit (MCU) 2, which is electrically connected directly or indirectly to a primary power source 3. The primary power source 3 shown in FIG. 1 is an aircraft turbine, which comprises a turbine driving a generator (not shown). The primary power source 3 supplies the MCU 2 with primary electrical power 8, in the present embodiment with AC power. The MCU 2 is electrically and electronically connected to a plurality of power management and distribution devices (PMDDs) 4a-4d. Each of the PMDDs 4a-4d is configured to power a plurality of personal electronic devices via outlet units, which will be shown in further figures in more detail. In the present embodiment, a first PMDD 4a is electrically and electronically connected directly to the MCU 2, wherein the further PMDDs 4b-4d are electrically and electronically connected indirectly to the MCU 2 via further PMDDs in a daisy chain fashion (see also FIG. 2).

Figure 2:
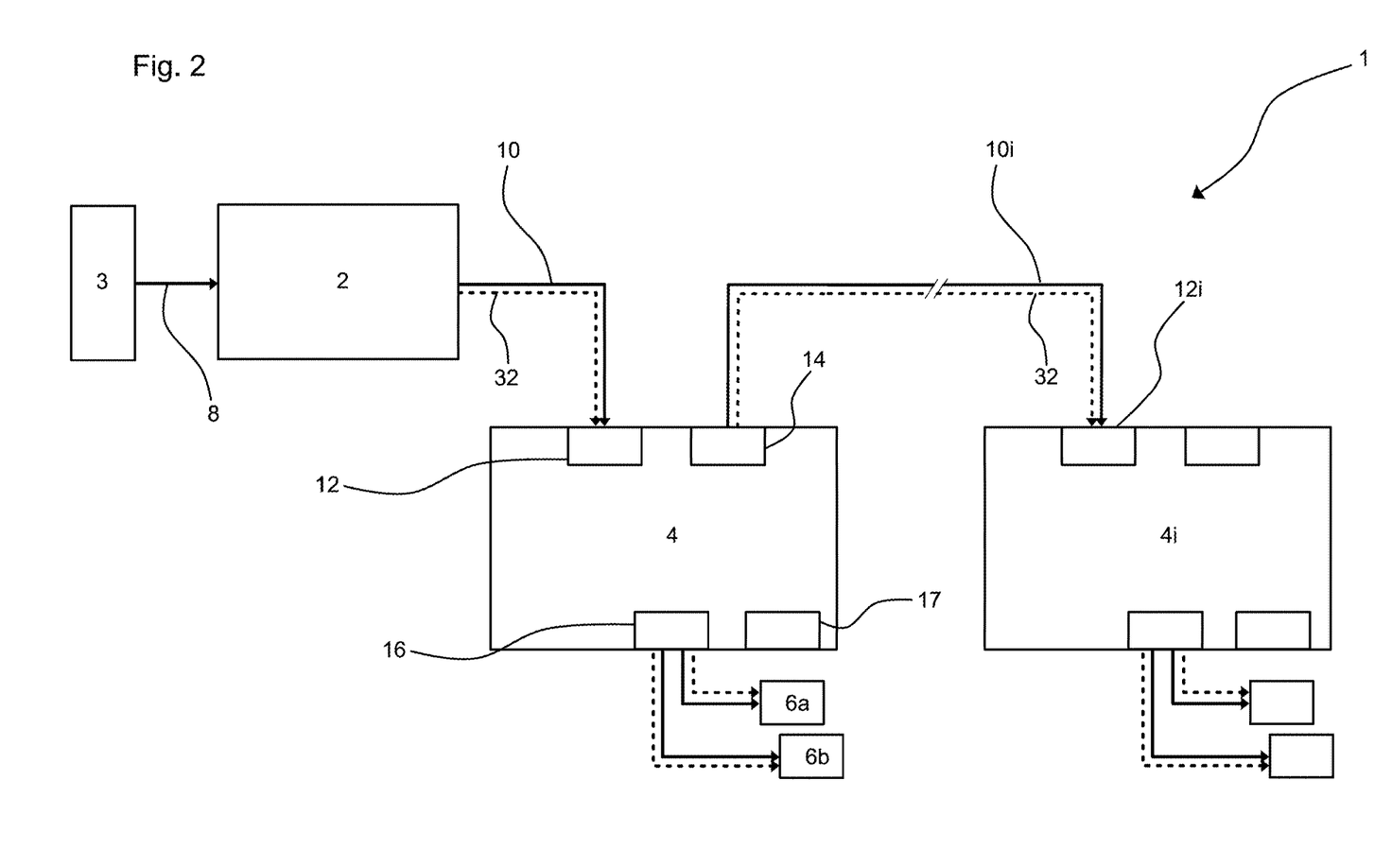
FIG. 2 schematically shows the power management and distribution system of FIG. 1.

Each PMDD 4 may be assigned to a single seat group, e.g. a seat group consisting of 2, 3, 4 or 5 individual seats. As depicted schematically in FIG. 1, PMDD 4a may manage and distribute power for the front left seat group and PMDD 4b may manage and distribute power for the front right seat group. In an embodiment, multiple outlet units of each seat group may be electrically and electronically connected to the corresponding PMDD 4, as illustrated in FIG. 2. In an embodiment of the invention not shown in the figures, each cabin zone, e.g. the first class, business class and/or economy class, could be provided with a separate MCU 2, each of said MCUs 2 being connected to the primary power source 3, e.g. in the above described fashion.

FIG. 2 shows the PMDS 1 of FIG. 1 in more detail. As derivable from FIG. 2, PMDD 4 comprises a first interface 12 for receiving electrical supply power 10 and a tri-state signal 32 directly from the MCU 2. The PMDD 4 comprises a second interface 14 for supplying at least a part of the electrical supply power 10 received at said first interface 12 to another PMDD 4i. The PMDD 4i also comprises a first interface 12i for receiving electrical supply power 10i and the tri-state signal 32 from the MCU 2, i.e. indirectly via at least the other PMDD 4. The PMDD 4 comprises a third interface 16 connected to outlet units 6a, 6b for supplying electrical outlet power to personal electronic devices (PEDs). The outlet units 6a, 6b may be located at passenger seats in the airplane cabin. The outlet units 6a, 6b are electrically and electronically connected directly to the PMDD 4. In the present embodiment, each outlet unit 6a, 6b comprises its own electrical line and its own electronic data line, as shown in FIG. 2. Preferably, the outlet units 6a, 6b are configured to draw power from the PMDD 4 and to receive data from the PMDD 4. In an embodiment, the data connection of the outlet units 6a, 6b to the PMDD 4 is uni-directional such that the outlet units 6a, 6b only receive data from the PMDD 4 but cannot send data to the PMDD 4. The PMDD 4 comprises a fourth interface 17 for supplying electrical power to in-flight entertainment (IFE) screens, which are not shown in FIG. 2. The PMDD 4 may control the IFE screens and may switch the power supplied to the IFE screens via the fourth interface 17 on and off. Each of the PMDDs 4i of the PMDS 1 of FIG. 2 may be configured identical to the PMDD 4.

Figure 3:
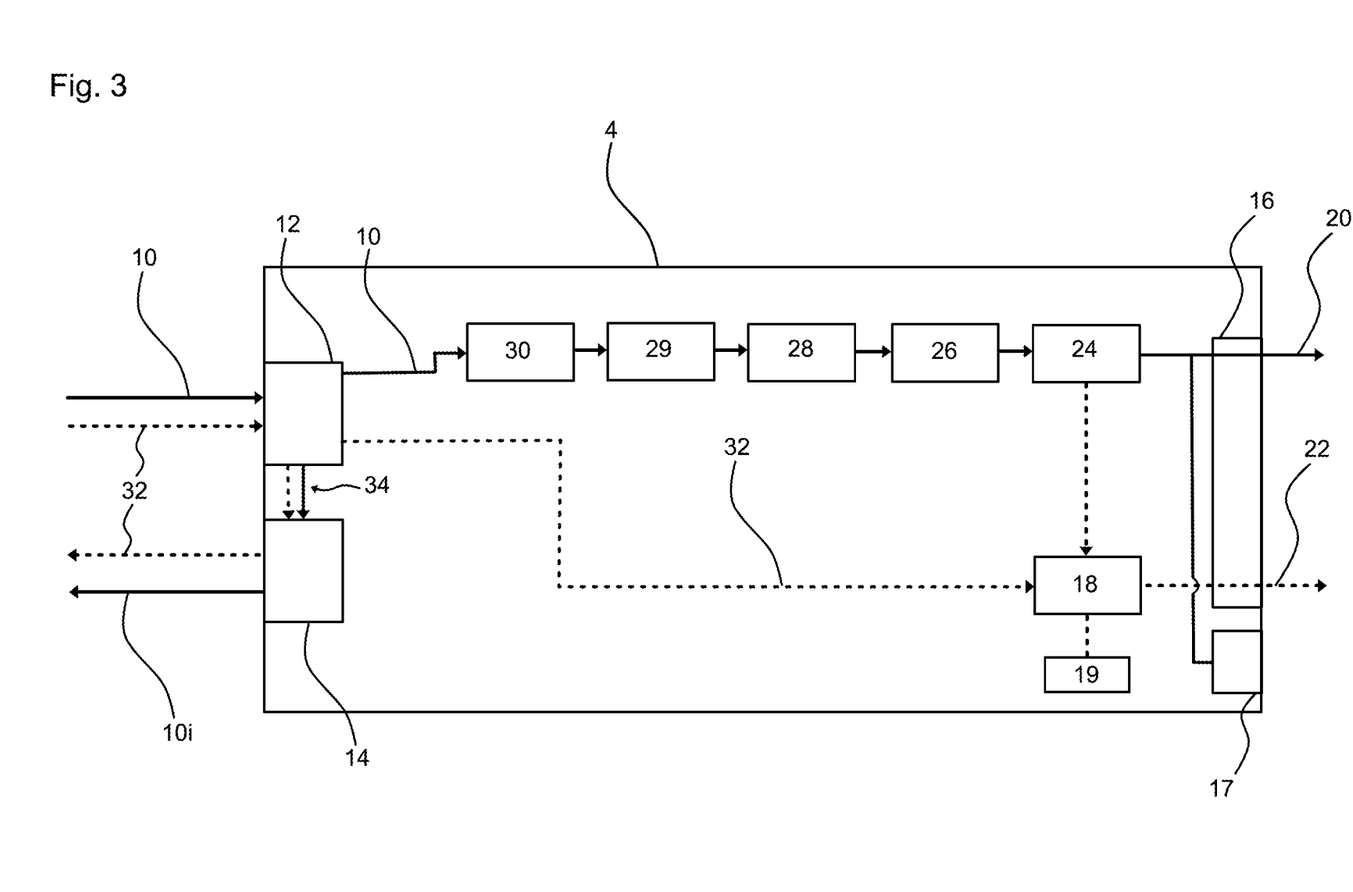
FIG. 3 schematically shows a power management and distribution device of the power management and distribution system of FIG. 2 according to an embodiment of the present invention.

The PMDD 4 of FIG. 2 is shown in more detail in FIG. 3. As derivable from FIG. 3, the first interface 12 of the PMDD 4 is electrically and electronically connected with the second interface 14 of the PMDD 4 via a connector 34. The connector 34 may be a daisy chain connector, enabling a connection of multiple PMDDs 4i in a daisy chain fashion. The connection between the first and second interfaces 12, 14 may be a direct connection. The second interface 14 may supply AC electrical supply power 10i to another PMDD 4i. Furthermore, the second interface 14 may send a tri-state signal 32 received from the MCU 2 to another PMDD 4i.

The primary interface 12 is, preferably directly, electrically connected to an input filter 30 to supply an electrical power thereto. Preferably, the input filter 30 may comprise a common mode and/or a differential mode filter. Additionally, the input filter 30 may comprise a fuse and an inrush limiter and/or temperature fuse protecting the further electronics within the PMDD 4 against high currents from the MCU 2. The input filter 30 is, preferably directly, electrically connected to an AC/DC converter 29. The AC/DC converter 29 may comprise an active rectifier. The AC/DC converter 29 may be controlled by a control unit, which is not shown in FIG. 3. Said control unit may be an integrated circuit (IC). The AC/DC converter 29 is, preferably directly, electrically connected to a power factor correction (PFC) unit 28. The PFC unit 28 may be controlled by an IC, which is not shown in FIG. 3. The PFC unit 28 may control the AC/DC converter 29, e.g. increase the power factor of the power converted by the AC/DC converter 29 for improving the performance of the PMDD 4. The PFC unit 28 is, preferably directly, electrically connected to a DC/DC converter 26. The DC/DC converter 26 may comprise an LLC half bridge or full bridge, an LLC transformer, and a synchronous rectifier. The DC/DC converter 26 may be controlled by at least one IC, which is not shown in FIG. 3. Said at least one IC may be controlled by a control unit 18 of the PMDD 4. The DC/DC converter 26 may convert high DC voltage power to low DC voltage power.

An AC/DC conversion device comprising the AC/DC converter 29, the PFC unit 28 and the DC/DC converter 26 may be configured to convert the AC electrical supply power 10 supplied from the MCU 2 via the first interface 12 into DC electrical outlet power 20. The DC electrical outlet power provided by the DC/DC converter may be drawn by personal electronic devices via the outlet units 6a, 6b, which are not shown in FIG. 3, but which will be described in connection with FIG. 4 below.

The DC/DC converter 26 is, preferably directly, electrically connected to a power measurement unit (PMU) 24. The PMU 24 may comprise a volt- and amperemeter configured to measure the voltage against ground and the current drawn through the PMU 24. The PMU 24 may comprise multiple volt- and amperemeters configured to measure each electrical outlet power 20 drawn by each outlet unit 6a, 6b, which are not shown in FIG. 3. The PMU 24 may be configured to send the result of the power measurement to the control unit 18. The PMU 24 may supply electrical outlet power 20 to the outlet units 6a, 6b via the third interface 16. The third interface 16 may comprise at least one physical outlet, e.g. at least one SUB-D outlet. The PMU 24 is electrically connected to the fourth interface 17, wherein said PMU may be configured to measure electrical outlet power 20 drawn via the fourth interface 17, e.g. by an IFE at the fourth interface 17.

The control unit 18 of the PMDD 4 is, preferably directly, electronically connected to the first interface 12. The control unit 18 receives a tri-state signal 32 from the MCU 2 via the first interface 12. The control unit 18 may be configured to determine a power control signal 22 based on the tri-state signal 32 and the result of the measured electrical outlet power 20 provided by the PMU 24. The control unit 18 is electronically connected to a non-volatile memory 19. The non-volatile memory may be a RAM, EPROM and/or EEPROM. The non-volatile memory 19 may comprise a power limit of the PMDD 4 and may describe the power capability of the PMDD 4. The control unit 18 may determine the power control signal 22 based on said power limit from the non-volatile memory 19. The control unit 18 may be a microcontroller.

Figure 4:
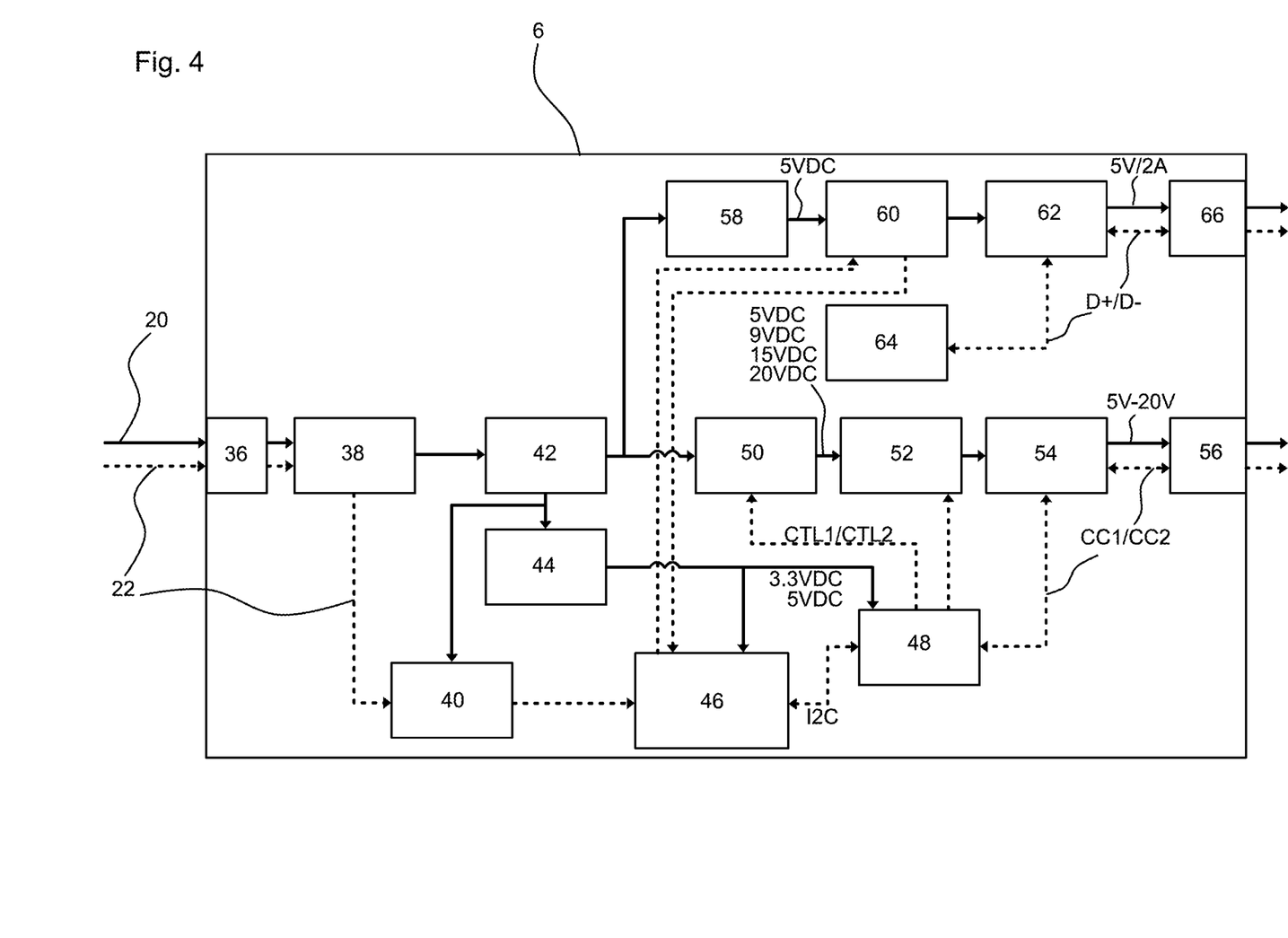
FIG. 4 schematically shows an outlet unit of the power management and distribution system of FIG. 2 according to an embodiment of the present invention.

An embodiment of one outlet unit 6, which may be coupled via the third interface 16 to the PMDD 4 shown in FIG. 3, is shown in FIG. 4. As described above, multiple outlet units 6 may be connected to the third interface 16 of the PMDD 4, which may each be configured as the outlet unit 6 described below. The outlet unit 6 is supplied with at least a part of said DC electrical outlet power 20 and the power control signal 22 from the PMDD 4 via the third interface 16 that is directly connected to an input plug 36. The outlet unit 6 may also be connected to the ground of the PMDD 4 via the input plug 36. The input plug 36 may be a SUB-D plug. The input plug 36 is, preferably directly, electrically and electronically connected to a lightning and ESD protection unit 38. The lightning and ESD protection unit 38 may protect the further electronic parts of the outlet unit 6 against high potential differences. The power control signal 22 is supplied from the lightning and ESD protection unit 38 to a 5-state logic unit 40, which provides a 5-state signal to a control unit 46 of the outlet unit 6. The lightning and ESD protection unit 38, the 5-state logic unit 40, and the control unit 46 are electronically connected. The control unit 46 may be a microcontroller.

The lightning and ESD protection unit 38 is, preferably directly, electrically connected to a filter unit 42, which preferably provides 28 VDC. The filter unit 42 is electrically connected to the 5-state logic unit 40 to supply said unit with power. Furthermore, the filter unit 42 is electrically connected to a DC/DC converter 44 for supplying power to the control unit 46 and a power delivery unit 48. The DC/DC converter 44 may convert 28 VDC to 3.3 VDC and 5 VDC to power the power delivery unit 48 and the control unit 46, respectively. The power delivery unit 48 may be a PD controller, preferably a USB-PD controller. The power delivery unit 48 is electronically connected via an I2C to the control unit 46. The power delivery unit 48 may receive a communicative signal from the control unit 46, e.g. the power control signal 22, which is supplied via the plug 36 from the PMDD.

The outlet unit 6 shown in FIG. 4 comprises one outlet plug for USB-C 56 and one outlet plug for USB-A 66. Alternatively, each outlet unit 6 may only comprise one outlet plug for USB-C 56. A PED may be coupled with each of the plugs 56, 66. The outlet plug for USB-C 56 is electrically and electronically directly connected to a filter and/or lightning and ESD protection 54, which is configured to protect a coupled PED. The filter and/or lightning and ESD protection 54 is electrically connected directly to a transistor 52, preferably a MOSFET. The transistor 52 is electronically connected to the power delivery unit 48 and electrically connected to a variable DC/DC converter 50. The DC/DC converter 50 is electrically connected to the filter unit 42 and is supplied by the filter unit 42 with DC electrical outlet power 20, preferably 28 VDC. The DC/DC converter 50 is electronically connected to the power delivery unit 48 via CTL1/CTL2. The power delivery unit 48 is electronically connected via the filter/lightning and ESD protection 54 to the output plug for USB-C 56 and is configured to negotiate via CC1/CC2 a power contract with a PED coupled to the output plug for USB-C 56. Based on the received power control signal 22 received from the PMDD 4 via the I2C from the control unit 46, the power delivery unit 48 may negotiate the power contract according to said power control signal 22. For example, the power delivery unit 48 may control the DC/DC convertor 50 to convert the voltage to an aspired value. Likewise, the power delivery unit 48 may control the transistor 52 to limit the voltage and/or current to an aspired value. Thus, the power delivery unit 48 may limit the power drawn by a PED connected to the USB-C plug 56 to an aspired value, which was determined by the control unit 18 of the PMDD and provided to the outlet unit 6 via the third interface 16.

Shown for this embodiment is also the outlet plug for USB-A 66 and corresponding electronics. The USB-A functionality may be omitted in another embodiment of the invention. The outlet plug for USB-A 66 is electrically and electronically connected to a filter/lightning and ESD protection 62. Said protection 62 may be configured to protect a coupled PED. The filter/lightning and ESD protection 62 is electronically connected to a charging port controller 64. The charging port control may control the power supplied via the filter/lightning and ESD protection 62 to the PED coupled to the outlet plug for USB-A 66. This may be done via a further transistor, which is not shown. The control of the power supplied to the PED may be done based on a negotiation via D+/D− communication between the charging port controller 64 and the PED via the outlet plug for USB-A 66 and the filter/lightning and ESD protection 62. The filter/lightning and ESD protection 62 is electrically connected to a transistor 60, preferably a MOSFET. The transistor 60 is electronically connected to the control unit 46, which may switch the transistor 60 and thus the USB-A plug 66 on or off. Alternatively, the power may be limited to a level between minimum (off) and maximum (on) power. The transistor 60 may send an over current signal to the control unit 46 in order to indicate a current limit reached by the transistor 60. The transistor 60 is electrically connected to a DC/DC converter 58, which may be configured to convert 28 VDC electrical outlet power 20 from the filter unit 42 to 5 VDC supplied to the transistor 60.

Figure 5:
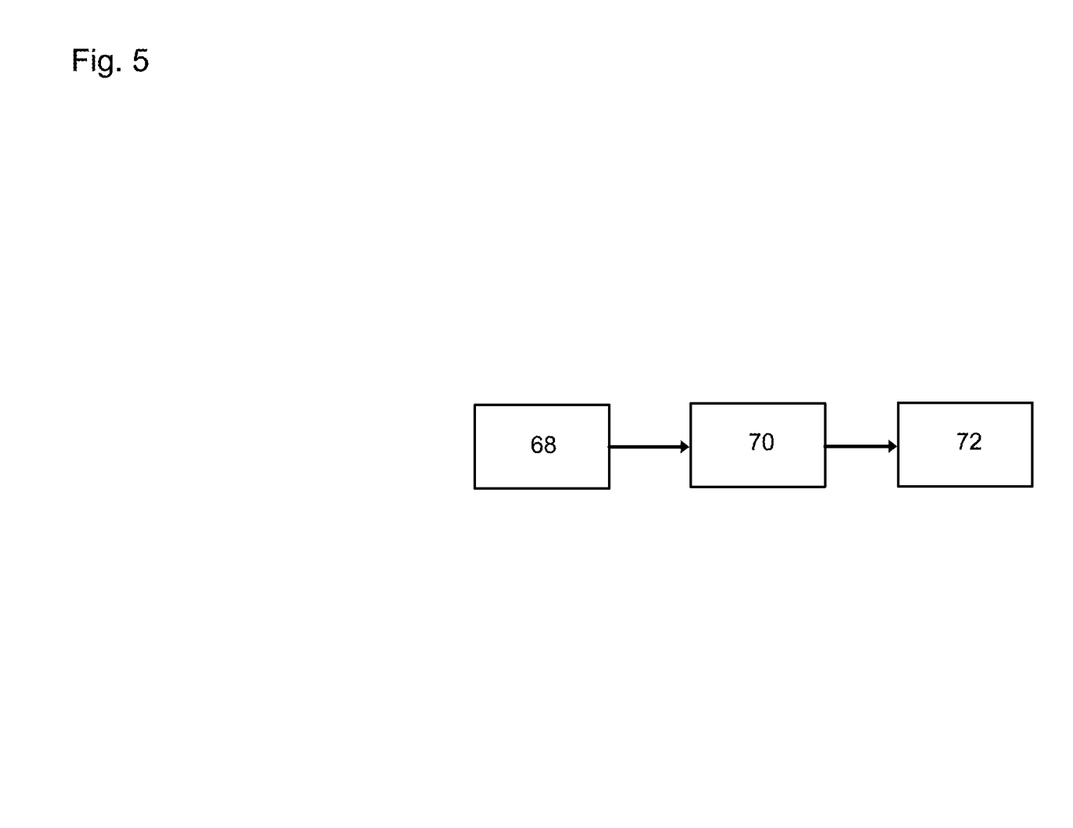
FIG. 5 schematically shows a state flow diagram of a method for managing and distributing power in an airplane cabin according to an embodiment of the present invention.

FIG. 5 schematically shows the steps of a method for managing and distributing power in an airplane cabin with the power management and distribution device shown in FIG. 3 according to an embodiment of the present invention. Specifically, the control unit 18 of the PMDD 4 may be configured to execute the below described method. Optionally, the method may comprise a step of receiving the tri-state signal from the MCU 2 (step not shown). Furthermore, the method comprises a step of measuring 68 with the power measurement unit 24 the electrical outlet power 20 drawn by personal electronic devices via the outlet units 6a, 6b. Subsequently, the method comprises the step of determining 70 the power control signal 22 based on a comparison of the measured electrical outlet power 20 with the power limit of the PMDD 4. Specifically, based on the tri-state signal, the control unit 18 of the PMDD 4 may either generate a power control signal 22 to switch some or all outlets units off. For the outlet units, which are not switched off on the basis of the tri-state signal, the control unit 18 determines a power control signal 22 based on a comparison of the measured outlet power 20 with the power limit of the PMDD 4. If the measured power outlet power 20 is larger than the power limit, the control unit 18 determines one of five discrete power limits for all of the outlet units which are not switched off. A further step is a step of sending 72 the power control signal 22 to all outlet units 6. Hereby, each outlet unit 6i may receive a specific power control signal 22i, or every outlet unit 6 may receive the same power control signal 22. The final step 72 is limiting the electrical outlet power 20 drawn by the PEDs in all outlet units 6 on the basis of the received power control signal 22.

For a specific embodiment, the PMDD 4 comprises a power limit of 100 W. When coupling two PEDs drawing 45 W each, the power limit of the PMDD 4 is not reached, as only 90 W are drawn. However, a third PED, also trying to draw 45 W from the PMDD 4 via its outlet unit 6, will increase the total drawn electrical outlet power 20 form the PMDD 4 to 135 W. The PMDD 4 measures said drawn electrical outlet power 20, compares this to its power limit of 100 W and determine a power control signal 22 for all of the outlet units 6, which ensures that the total power limit of 100 W of the PMDD 4 is not exceeded. Each of the outlet units 6 negotiates a new power contract with their coupled PED on the basis of the power control signal 22 provided to said outlet unit. For instance, the power control signal 22 may indicate a maximum power for each outlet unit of 27 W. Therefore, each of the outlet units 6 will negotiate a new power contract with its PEDs to ensure that the entire outlet unit does not draw more than 27 W of power.

LIST OF REFERENCE SIGNS 1 power management and distribution system
2 master control unit
3 primary power source
4, 4a-4d power management and distribution device
6, 6a, 6b outlet unit
8 (AC) primary electrical power
10 (AC) electrical supply power
12, 12i first interface
14 second interface
16 third interface
17 fourth interface
18 control unit
19 non-volatile memory
20 (DC) electrical outlet power
22 power control signal
24 power measurement unit
26 (DC/DC) converter
28 power factor correction unit
29 (AC/DC) converter
30 input filter
32 tri-state signal
34 (daisy chain) connector
36 input plug (of outlet unit)
38 lightning and ESD protection unit
40 5-state logic unit
42 filter unit
44 (DC/DC) converter
46 control unit (of outlet unit)
48 power delivery unit
50 (DC/DC) converter unit
50 transistor (for USB-C outlet)
54 filter/lightning and ESD protection (for USB-C outlet)
56 output plug for USB-C
58 (DC/DC) converter
60 transistor (for USB-A outlet)
62 filter/lightning and ESD protection (for USB-A outlet)
64 charging port controller
66 outlet plug for USB-A
68 (step of) measuring outlet power by outlet units
70 (step of) comparing measured outlet power with power limit
72 (step of) sending power control signal to outlet units

The invention claimed is:

1. A power management and distribution device for powering personal electronic devices via outlet units at passenger seats in an airplane cabin, the power management and distribution device comprising:
    a first interface for receiving electrical supply power from a master control unit connected to a primary power source;
    a second interface for supplying electrical supply power received at said first interface to another power management and distribution device;
    a third interface for supplying electrical supply power received at said first interface to the personal electronic devices via the outlet units;
    a power measurement unit configured to measure the electrical outlet power drawn by the personal electronic devices via the outlet units; and
    a control unit configured to control the electrical outlet power drawn by the personal electronic devices via the outlet units based on the measured electrical outlet power.

2. The power management and distribution device according to claim 1, wherein the control unit is configured to determine a power control signal for controlling the electrical outlet power drawn by at least one of the personal electronic devices via at least one of the outlet units and wherein the power management and distribution device is configured to send the power control signal to said at least one outlet unit via the third interface.

3. The power management and distribution device according to claim 1, further comprising a non-volatile memory connected to the control unit, wherein said non-volatile memory comprises a power limit of the power management and distribution device and wherein the control unit is configured to limit the electrical outlet power drawn by the personal electronic devices via the outlet units based on a comparison of the measured electrical outlet power and said power limit.

4. The power management and distribution device according to claim 1, wherein the control unit is configured to limit the electrical outlet power drawn by the personal electronic devices via the outlet units to a finite number of discrete power levels.

5. The power management and distribution device according to claim 1, wherein the control unit is configured to limit the electrical outlet power drawn by the personal electronic devices via the outlet units to the same power level for all outlet units of the power management and distribution device.

6. The power management and distribution device according to claim 1, further comprising an AC/DC conversion device configured to convert AC electrical supply power supplied by the master control unit via the first interface to DC power supplied to the personal electronic devices via the third interface and the outlet units.

7. The power management and distribution device according to claim 1, further comprising a fourth interface, wherein the power management and distribution device is configured to supply in-flight entertainment screens with electrical outlet power via the fourth interface.

8. The power management and distribution system according to claim 7, wherein the outlet units are each configured to receive the power control signal from the power management and distribution device and are each configured to limit the drawn electrical outlet power by the personal electronic devices according to the power control signal.

9. The power management and distribution system according to claim 8, wherein each of the outlet units comprises a power delivery unit configured to negotiate a power contract with a coupled personal electronic device based on the power control signal received from the power management and distribution device via the third interface.

10. A power management and distribution system, comprising:
   at least one power management and distribution device according to claim 1; and
   at least two outlet units connected to the third interface of the power management and distribution device, each outlet unit comprising at least one USB outlet and each configured to supply electrical outlet power to a personal electronic device.

11. The power management and distribution system according to claim 10, wherein at least one of said outlet units comprises an outlet plug for USB-C and an outlet plug for USB-A.

12. The power management and distribution system according to claim 10, further comprising:
   a master control unit configured to receive primary electrical power from a primary power source; and
   a plurality of power management and distribution devices according to claim 1, each configured to receive electrical supply power from the master control unit via its first interface.

13. The power management and distribution system according to claim 12, wherein a first power management and distribution device is connected to the master control unit via its first interface and a second power management and distribution device is connected via its first interface to the second interface of the first power management and distribution device in a daisy chain fashion.

14. A method for managing and distributing power in an airplane cabin with a power management and distribution device, preferably with a power management and distribution device according to claim 1, the method comprising the steps:
   measuring the electrical outlet power drawn by personal electronic devices via outlet units;
   determining a power control signal based on a comparison of the measured electrical outlet power with a power limit of the power management and distribution device; and
   sending a power control signal to the outlet units for limiting the electrical outlet power drawn by the personal electronic devices via the outlet units.

* * * * *